(12) United States Patent
Mao et al.

(10) Patent No.: US 12,278,579 B1
(45) Date of Patent: Apr. 15, 2025

(54) INTELLIGENT CONTROL SYSTEM FOR CIRCULAR HIGH- POWER VIBRATION MOTOR

(71) Applicant: Hainan Trailblazer New Material Technology Co., Ltd., Changjiang Li Autonomous County (CN)

(72) Inventors: Liangcheng Mao, Changjiang Li Autonomous County (CN); Pingsheng Mao, Changjiang Li Autonomous County (CN); Juhai Liu, Changjiang Li Autonomous County (CN)

(73) Assignee: Hainan Trailblazer New Material Technology Co., Ltd., Changjiang Li Autonomous County (CN)

( * ) Notice: Subject to any disclaimer, the term of this patent is extended or adjusted under 35 U.S.C. 154(b) by 0 days.

(21) Appl. No.: 18/991,860

(22) Filed: Dec. 23, 2024

Related U.S. Application Data

(63) Continuation of application No. PCT/CN2024/094394, filed on May 21, 2024.

(30) Foreign Application Priority Data

Jun. 8, 2023 (CN) .......................... 202310675986.1

(51) Int. Cl.
*H02P 25/032* (2016.01)
*H02K 7/06* (2006.01)

(52) U.S. Cl.
CPC ........... *H02P 25/032* (2016.02); *H02K 7/061* (2013.01)

(58) Field of Classification Search
CPC .............................. H02P 25/032; H02K 7/061
USPC .................................................. 318/114, 119
See application file for complete search history.

(56) References Cited

U.S. PATENT DOCUMENTS 10,566,889 B2 * 2/2020 Katada .................. H02K 33/16

FOREIGN PATENT DOCUMENTS

| CN | 103384133 A | 11/2013 |
| CN | 103620928 A | 3/2014 |
| CN | 111005255 A | 4/2020 |

OTHER PUBLICATIONS

Title of the Item: Automation PanoramaPublication Date: Jun. 15, 2012Name of the Author: Zhou XiaoxiaArticle Title: Synchronous Vibration Control System for Multiple Pile Hammers Based on B&R'sIndustrial Control Productspp. 92-96.

* cited by examiner

*Primary Examiner* — David Luo
(74) *Attorney, Agent, or Firm* — George D. Morgan

(57) ABSTRACT

An intelligent control system for a circular high-power vibration motor is provided. The control system controls a plurality of operating parameters of a plurality of vibration motors by a control module so as to cooperate in a process of generating vibration. The plurality of vibration motors are mounted on a motor frame and distributed evenly at equal angles. Eccentric members are respectively provided at two ends of a central shaft of each vibration motor. A detection module detects rotation phases of the eccentric members, and the control module is configured to adjust one or more vibration motors to accelerate or decelerate rotation based on phases of the eccentric members, so that vibration parameters generated by the plurality of vibration motors are the same or tend to be the same. The detection module includes a plurality of photoelectric sensors.

5 Claims, 6 Drawing Sheets

INTELLIGENT CONTROL SYSTEM FOR CIRCULAR HIGH-POWER VIBRATION MOTOR

CROSS-REFERENCE TO RELATED APPLICATIONS

The application claims priority to Chinese patent application No. 2023106759861, filed on Jun. 8, 2023, the entire contents of which are incorporated herein by reference.

TECHNICAL FIELD

The present disclosure relates to the technical field of vibration devices, and in particular, to an intelligent control system for a circular high-power vibration motor.

BACKGROUND

With regard to circular vibrating machinery, a large number of vibration motors and structures thereof are specifically used in industrial production, but it is gradually becoming difficult to meet future application conditions with the increase in production requirements. For large circular vibrating machinery, very high power and exciting force of the vibration motor are required. However, after a material and a performance limit of the existing vibration motor reach a certain marginal effect, it is difficult to meet a need for performance improvement, which inevitably leads to a substantial increase in production costs. Moreover, if the existing vibration motor structure is scaled up to high-power, the eccentric mass becomes very large, which leads to high requirements for the bearings. If the bearings fail, maintenance is difficult or comes at a high cost.

According to disclosed technical solutions, the patent with publication No. SG11201507746WA proposes a vibration generating device. This device includes a vibration generator equipped with two parallel eccentric shafts. By using asynchronous start and stop mechanisms, the impact during startup and shutdown is reduced, thereby effectively lowering the motor's startup power. In the patent with publication No. EP3939709A1, a vibration generator is provided with an inner and an outer housing. Magnetic fixation and induction principles are adopted to cause vibration generated by the vibration generator to be basically isolated in the inner housing, thereby reducing noise during operation of the vibration generator. The patent with publication No. U.S. Pat. No. 9,762,111B2 proposes a device for generating linear vibrations, which comprises a housing made of a magnetic material, a vibrator, and an elastic component. The housing is engaged with a support to create an internal space; the vibrator includes a permanent magnet designed to work with a coil to generate a vibration force as well as a weight encircling the permanent magnet; the elastic component is positioned between the vibrator and the stator to elastically support vertical vibration of the vibrator; by passing a controllable current through the coil, linear and controllable vibrations are generated.

All the above technical solutions propose related vibration generation schemes and protective measures, but they still cannot solve the above-mentioned problem of generating vibrations when high power is required.

The foregoing background description is intended only to facilitate an understanding of the present disclosure. This description does not constitute an endorsement or acknowledgment of any part of the mentioned materials as common knowledge.

SUMMARY

An objective of the present disclosure is to provide an intelligent control system for a circular high-power vibration motor. The control system controls multiple operating parameters for multiple vibration motors by a control module so as to cooperate in a process of generating vibration. The plurality of vibration motors are mounted to a motor frame and distributed evenly at equal angles. Eccentric members are respectively provided at two ends of a central shaft of each vibration motor. A detection module detects rotation phases of the eccentric members, and the control module is configured to adjust one or more vibration motors to accelerate or decelerate rotation based on phases of the eccentric members, so that vibration parameters generated by the plurality of vibration motors are the same or tend to be the same. The detection module includes a plurality of photoelectric sensors. Each photoelectric sensor detects an eccentric member based on an optical technology, so as to obtain a phase of the eccentric member. Moreover, the control module calculates the current rotating speed of the vibration motor based on a change in the phase of the eccentric member.

The present disclosure adopts the following technical solutions:

An intelligent control system for a circular high-power vibration motor is provided, where the control system is applied to a screening device including a plurality of vibration motors; and the control system includes:
  a control module, configured to control a plurality of control sub-modules, where each control sub-module is configured to independently control operating parameters of one vibration motor, and the operating parameters include at least a phase, a rotating speed, output power, and output torque of the vibration motor;
  vibration motors, where a plurality of same vibration motors are mounted to a motor frame and distributed evenly at equal angles; a first eccentric member and a second eccentric member are respectively provided at two ends of a central shaft of each vibration motor; and
  a detection module, configured to detect rotation phases of the first eccentric member and/or the second eccentric member and transmit a plurality of pieces of detected rotation phase data to the control module, where
  the control module is configured to adjust one or more vibration motors to accelerate or decelerate rotation based on phases of a plurality of first eccentric members or second eccentric members obtained by the detection module, so that vibration parameters generated by the plurality of vibration motors are the same or tend to be the same; and
  the detection module includes a plurality of photoelectric sensors; each photoelectric sensor is arranged on a side of a motor body of the vibration motor opposite the first eccentric member or the second eccentric member; the first eccentric member or the second eccentric member is used as a detection object based on an optical technology, so as to obtain a phase of the first eccentric member or the second eccentric member; and the control module calculates a current rotating speed of the vibration motor based on a change in the phase of the first eccentric member or the second eccentric member.

Preferably, the motor frame includes a plurality of mounting holes for mounting the vibration motors; and the vibration motor is fixedly connected to the motor frame by two or more mounting components arranged on an outer side of the motor body.

Preferably, 4 to 10 vibration motors are provided.

Preferably, a plurality of the elastic elements are further arranged on one of working surfaces of the motor frame; and the motor frame is supported on a base by the plurality of elastic elements.

Preferably, the control system sets one of the vibration motors as a master motor, and sets a detection module correspondingly mounted on the master motor as a master detection module; and a control sub-module correspondingly controlling the master motor is a master control sub-module.

In addition, vibration motors other than the master motor are set as slave motors; detection modules correspondingly mounted on the slave motors are slave detection modules; and control sub-modules correspondingly controlling the slave motors are slave control sub-modules.

Preferably, after the control module 2 obtains operating parameters of the master motor and a plurality of slave motors, using the speed and phase of the master motor as references, the control module 2 calculates target operating parameters of the plurality of slave motors based on the operating parameters of the master motor, so that the plurality of vibration motors operate at a synchronous speed, and the first eccentric member and the second eccentric member in each vibration motor are synchronized to have the same phase.

Preferably, cylindrical protective covers connected to the motor body are provided at two sides of the vibration motor; and each protective cover is configured to cover the first eccentric member or the second eccentric member;

the photoelectric sensor is positioned on the circular end surface of the protective cover; the photoelectric sensor is configured to face the eccentric member inside the protective cover; the photoelectric sensor emits detection light to a detected surface of the eccentric member and then receives an optical signal of reflected light of the detection light reflected by the detected surface;

the detected surface of the eccentric member is marked with a scale; during rotation of the eccentric member, the detection light is affected by the scale, thus generating the optical signal of the reflected light that is recognizable; and the detection module obtains the optical signal of the reflected light and transmits the optical signal to the control module 2 for analysis, so as to obtain a plurality of operating parameters of the vibration motor.

Further, according to the control system, a control method is applied, and the control method includes calculating target output power q of each of n vibration motors based on currently required total output power Q, that is:

$$q = \varepsilon \frac{Q}{n},$$

where ε is a power compensation coefficient, with a specific value set by a relevant technician based on a total power loss during cooperative operation of the plurality of vibration motors after an experiment; and the method further includes shutting down at most half of the n vibration motors based on a power factor curve of each vibration motor, and reserving k motors of the n vibration motors, to achieve a higher energy efficiency ratio; and the following steps are adopted to select a specific number of reserved k motors:

S100: extracting, by the control module, an efficiency and load rate curve of each vibration motor;

S200: calculating a current load rate of the vibration motor and efficiency η corresponding to the load rate based on operating parameters of the vibration motor;

S300: if a current efficiency point causes current efficiency η to be less than preset minimum efficiency $\eta_{min}$ due to an excessively low load rate, performing step S400; and S400: calculating a number of vibration motors that need to stop operating, and shutting down the vibration motors that need to stop operating.

Preferably, step S400 includes the following substeps:

S410: determining a value of n;

S420: calculating a minimum possible value $k_{min}$ of k, that is, calculating n/2 and rounding up to obtain $k_{max}$;

S430: increasing a value of k one by one starting from k=$k_{max}$, and calculating whether the following conditions are met:

condition A: whether k vibration motors can be distributed at equal angles; or condition B: whether k vibration motors can be distributed symmetrically and whether k is an even number;

S440: setting a current value of k to meet one of the condition A or the condition B, and calculating target output power of each vibration motor and a corresponding efficiency value $\eta_k$ based on the current value of k;

if a plurality of k values, namely $k_1$, $k_2$, . . . , all meet one of the condition A or the condition B, recording corresponding efficiency values $\eta_{k1}$, $\eta_{k2}$, . . . , and calculating a maximum value thereof as an optimal efficiency value $\eta_{k\text{-}top}$;

if only a unique k value meets one of the condition A or the condition B, setting $\eta_{k\text{-}top}=\eta_k$; and S450: shutting down n-k vibration motors based on a k value corresponding to the optimal efficiency value $\eta_{k\text{-}top}$, where motors that are chosen to be shut down cannot include the master motor; and one of the condition A or the condition B is still met after n-k vibration motors are shut down.

The present disclosure has the following beneficial effects:

In the control system according to the present disclosure, a plurality of vibration motors with lower power are synchronously arranged, so that a vibration mode of only using an independent high-power vibration motor conventionally can be effectively replaced, and requirements for strengths of related mounting parts, bearings, and transmission parts are greatly reduced, thereby obviously reducing investment costs and maintenance costs of the vibration motors.

In the control system according to the present disclosure, a detection device with photoelectric sensors and a photoelectric detection method are used, which can overcome an impact of plenty of vibration generated during operation by the vibration motors on a conventional mechanical detection method, and improve detection accuracy.

In the control system according to the present disclosure, at most half of the vibration motors are controlled to stop operating under some working conditions, which effectively causes a plurality of vibration motors to be in an operating range with optimal output power efficiency, thereby improving an energy efficiency ratio of the whole system.

In the control system according to the present disclosure, a modular design is adopted in each software and hardware part, which facilitates upgrade or replacement of related software and hardware environments in the future and reduces operational costs.

BRIEF DESCRIPTION OF DRAWINGS

The present disclosure can be further understood from the following description taken with reference to accompanying drawings. Components in the figures are not necessarily drawn to scale, but emphasis is placed on the principles of the illustrated embodiments. In different views, the same reference signs designate corresponding parts.

Figure 1:
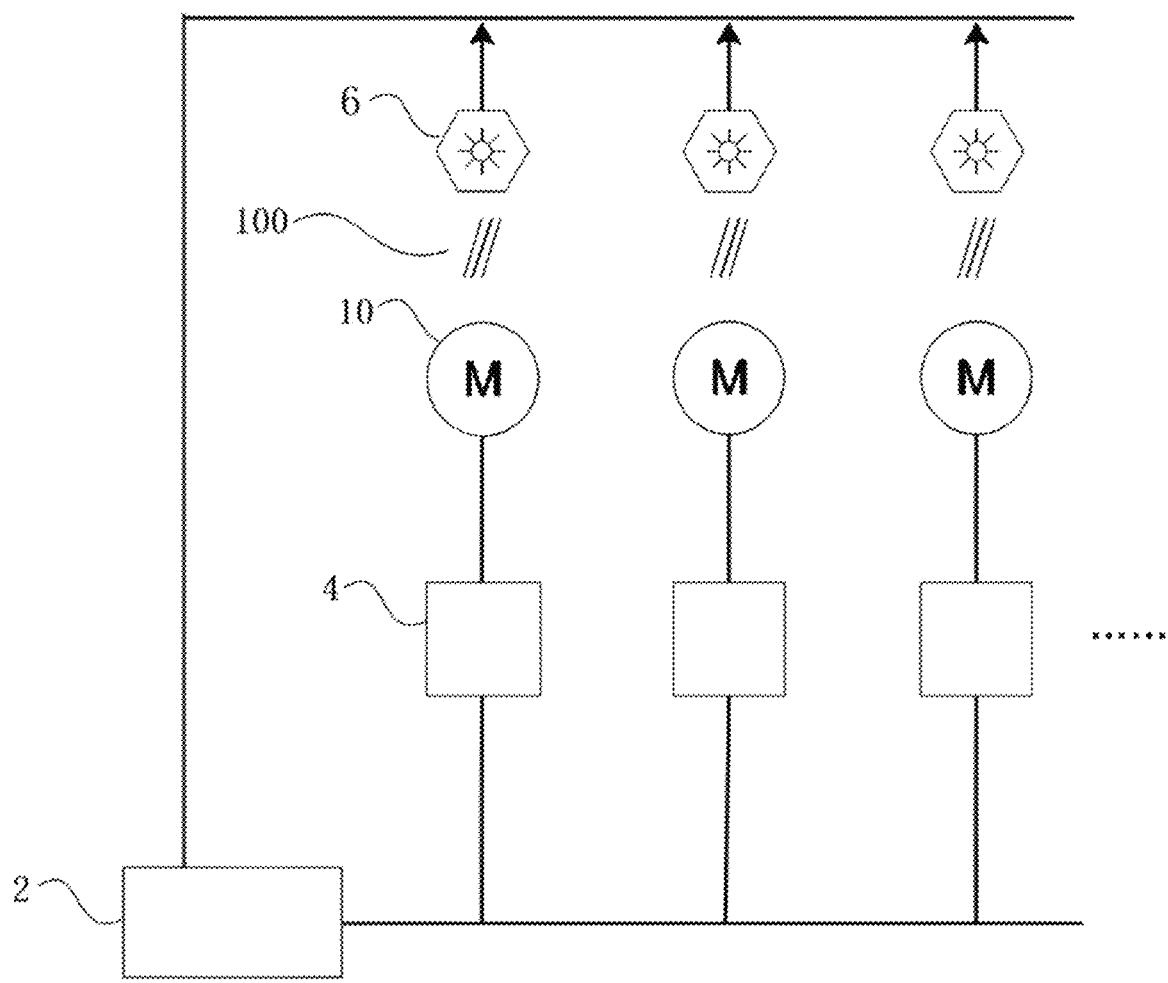
FIG. 1 is an overall schematic diagram of a control system according to the present disclosure.

Description of reference signs: 2—Control module; 4—Control sub-module; 6—Photoelectric sensor; 10—Vibration motor; 11—First eccentric member; 12—Second eccentric member; 13—Protective cover; 14—Photoelectric sensor; 15—Scale; 16—Motor body; 21—Motor frame; 22—Frame flange; 23—Mounting hole; 61—First motor; 62—Second motor; 63—Third motor; 64—Fourth motor; 65—Fifth motor; 66—Sixth motor; 100—Reflected light.

DETAILED DESCRIPTION OF THE EMBODIMENTS

In order to make the objectives, technical solutions, and advantages of the present disclosure clearer, the present disclosure is further described in detail below with reference to embodiments of the present disclosure. It should be understood that the specific embodiments described herein are only intended to explain the present disclosure and are not intended to limit the present disclosure. Other systems, methods, and/or features of the embodiments will become apparent to those skilled in the art upon reviewing the following detailed description. It is intended that all such additional systems, methods, features, and advantages are included in this specification, fall within the scope of the present disclosure and are protected by the appended claims. Additional features of the disclosed embodiments are described in detail below, and these features will be apparent from the following detailed description.

The same or similar reference signs in the drawings of the embodiments of the present disclosure correspond to the same or similar components. In descriptions of the present disclosure, it should be understood that, if orientation or positional relationships indicated by terms "upper", "lower", "left", "right", and the like are orientation or positional relationships based on the accompanying drawings, the terms are merely intended to facilitate the descriptions of the present disclosure and simplify the descriptions, rather than indicating or implying that a device or assembly referred to must have a specific orientation. With construction and operation in a specific orientation, the terms describing the positional relationship in the accompanying drawings are only used for illustration and cannot be understood as a limitation on this patent. Those of ordinary skill in the art may understand specific meanings of the above terms based on a specific situation.

Figure 2:
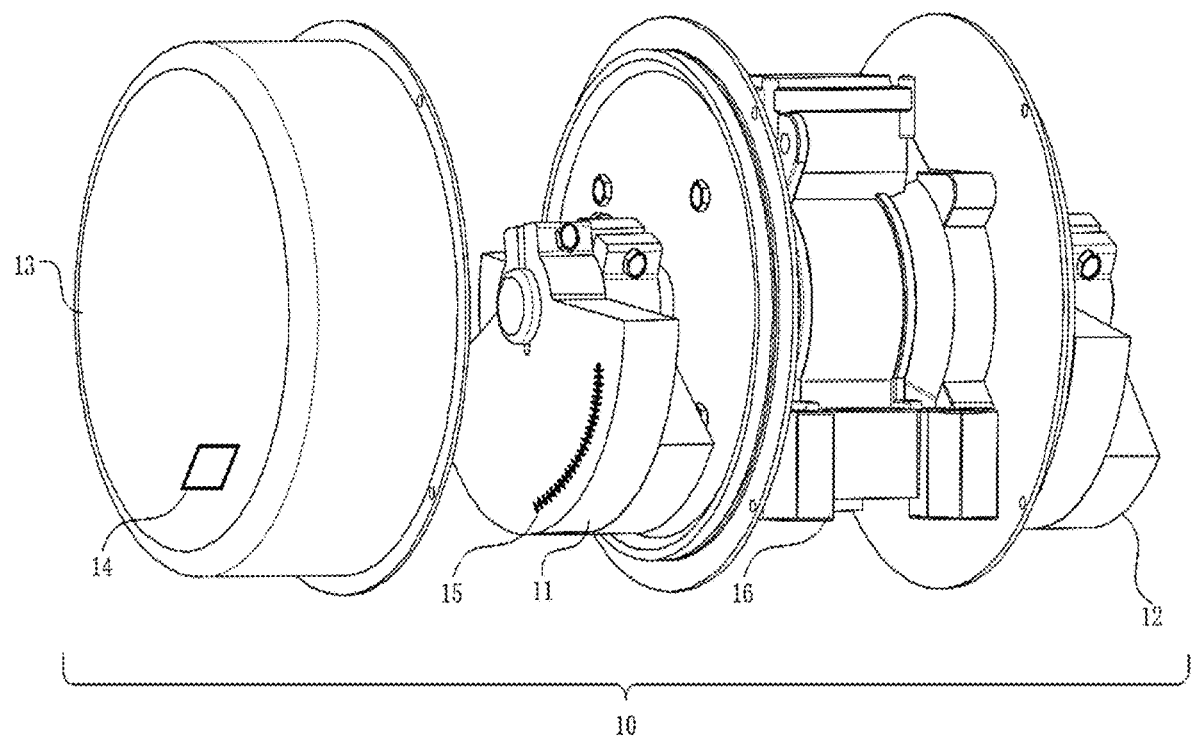
FIG. 2 is a schematic structural diagram of an vibration motor according to an embodiment of the present disclosure.

Embodiment 1: For example, an intelligent control system for a circular high-power vibration motor is provided. As shown in FIG. 1, the control system is applied to a screening device including a plurality of vibration motors; and the control system includes:

a control module 2, configured to control a plurality of control sub-modules 4, where each control sub-module 4 is configured to independently control operating parameters of one vibration motor, and the operating parameters include at least a phase, a rotating speed, output power, and output torque of the vibration motor;

vibration motors 10, where as shown in FIG. 2, a plurality of same vibration motors 10 are mounted to a motor frame 21 and distributed evenly at equal angles; a first eccentric member 11 and a second eccentric member 12 are respectively provided at two ends of a central shaft of each vibration motor 10; and a detection module, configured to detect rotation phases of the first eccentric member and/or the second eccentric member and transmit a plurality of pieces of detected rotation phase data to the control module 2, where the control module 2 is configured to adjust one or more vibration motors 10 to accelerate or decelerate rotation based on phases of a plurality of first eccentric members 11 or second eccentric members 12 obtained by the detection module, so that vibration parameters generated by the plurality of vibration motors 10 are the same or tend to be the same; and the detection module includes a plurality of photoelectric sensors 6; each photoelectric sensor 6 is arranged on a side of a motor body 16 of the vibration motor 10 opposite the first eccentric member 11 or the second eccentric member 12; the first eccentric member 11 or the second eccentric member 12 is detected as a detection body based on an optical technology, so as to obtain a phase of the first eccentric member 11 or the second eccentric member 12; and the control module 2 calculates a current rotating speed of the vibration motor 10 based on a change in the phase of the first eccentric member or the second eccentric member.

Figure 3:
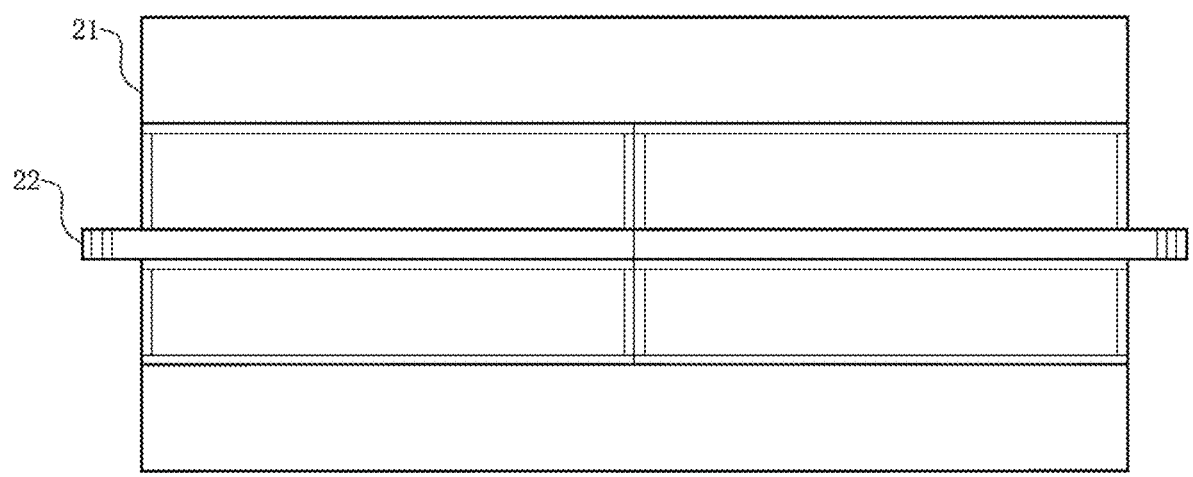
FIG. 3 is a schematic side view of a motor frame according to an embodiment of the present disclosure.
Figure 4:
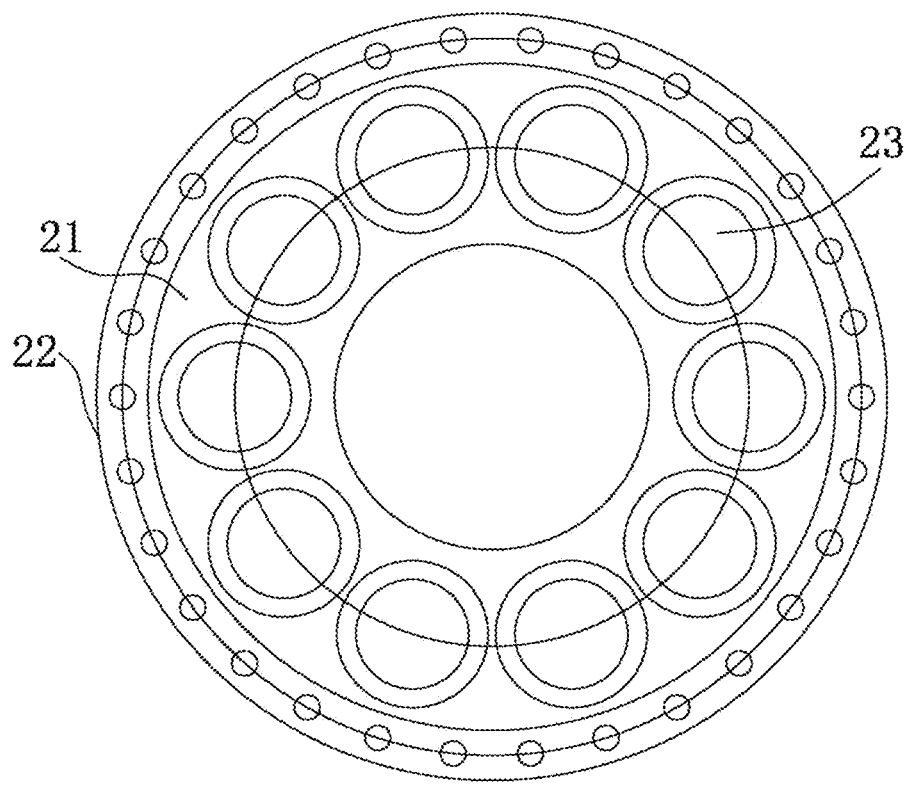
FIG. 4 is a schematic top view of a motor frame according to an embodiment of the present disclosure.

Preferably, as shown in FIGS. 3 and 4, the motor frame 21 includes a plurality of mounting holes 23 for mounting the vibration motors; and the vibration motor 10 is fixedly connected to the motor frame 21 by two or more mounting components arranged on an outer side of the motor body 16.

Preferably, 4 to 10 vibration motors 10 are provided.

Preferably, a plurality of elastic elements are further arranged on one of working surfaces of the motor frame 21; and the motor frame is supported on a base by the plurality of elastic elements.

Preferably, the control system sets one of the vibration motors 10 as a master motor, and sets a detection module correspondingly mounted on the master motor as a master detection module; and a control sub-module correspondingly controlling the master motor is a master control sub-module.

In addition, all vibration motors except for the master motor are set as slave motors; detection modules mounted on the slave motors are referred to as slave detection modules; and control sub-modules that control the slave motors are known as slave control sub-modules.

Preferably, after the control module 2 obtains operating parameters of the master motor and a plurality of slave motors, with a speed and a phase of the master motor as references, the control module 2 calculates the target operating parameters for the slave motors based on those of the master motor, so that the plurality of vibration motors operate at a synchronous speed, and the first eccentric member and the second eccentric member in each vibration motor are synchronized to have the same phase.

Preferably, cylindrical protective covers 13 connected to the motor body 16 are provided at two sides of the vibration motor 10; and each protective cover 13 is configured to cover the first eccentric member 11 or the second eccentric member 12;

the photoelectric sensor 6 is arranged on a circular end surface of the protective cover 13; the photoelectric sensor 6 is configured to face the eccentric member inside the protective cover 13; the photoelectric sensor 6 emits detection light to a detected surface of the eccentric member and then receives an optical signal of reflected light 100 of the detection light reflected by the detected surface;

the detected surface of the eccentric member is marked with a scale 15; during rotation of the eccentric member, the detection light is affected by the scale, thus generating a recognizable optical signal from the reflected light 100; and the detection module obtains the optical signal from the reflected light 100 and transmits the optical signal to the control module 2 for analysis, so as to obtain a plurality of operating parameters of the vibration motor 10.

Further, according to the control system, a control method is applied, and the control method includes calculating target output power q of each of n vibration motors based on currently required total output power Q, that is:

$$q = \varepsilon \frac{Q}{n},$$

where ε is a power compensation coefficient, with a specific value set by a relevant technician based on a total power loss during cooperative operation of the plurality of vibration motors after an experiment; and the method further includes shutting down at most half of the n vibration motors based on a power factor curve of each vibration motor, and reserving k motors of the n vibration motors, to achieve a higher energy efficiency ratio; and the following steps are adopted to select a specific number of reserved k motors.

S100: Extract, by the control module, an efficiency and load rate curve of each vibration motor.

S200: Calculate a current load rate of the vibration motor and efficiency η corresponding to the load rate based on operating parameters of the vibration motor.

S300: If a current efficiency point causes current efficiency η to be less than preset minimum efficiency $\eta_{min}$ due to an excessively low load rate, perform step S400.

S400: Calculate a number of vibration motors that need to stop operating, and shut down the vibration motors that need to stop operating.

Preferably, step S400 includes the following substeps.

S410: Determine a value of n.

S420: Calculate a minimum possible value $k_{min}$ of k, that is, calculate n/2 and round up to obtain $k_{max}$.

S430: Increase a value of k one by one starting from k=$k_{max}$, and calculate whether the following conditions are met:

condition A: whether k vibration motors can be distributed at equal angles; or condition B: whether k vibration motors can be distributed symmetrically and whether k is an even number;

S440: Set a current value of k to meet one of the condition A or the condition B, and calculate target output power of each vibration motor and a corresponding efficiency value $\eta_k$ based on the current value of k.

If a plurality of k values, namely $k_1$, $k_2$, . . . , all meet one of the condition A or the condition B, record corresponding efficiency values $\eta_{k1}$, $\eta_{k2}$, . . . , and calculate a maximum value thereof as an optimal efficiency value $\eta_{k\text{-}top}$.

If only a unique k value meets one of the condition A or the condition B, set $\eta_{k\text{-}top}=\eta_k$.

S450: Shut down n-k vibration motors based on a k value corresponding to the optimal efficiency value $\eta_{k\text{-}top}$.

Motors that are chosen to be shut down cannot include the master motor.

One of the condition A or the condition B is still met after n-k vibration motors are shut down.

Embodiment 2: This embodiment should be understood as including at least all the features of any one of the foregoing embodiments, and is further improved on the basis thereof.

When a plurality of vibration motors operate together, eccentric members (a first eccentric member 11 and a second eccentric member 12) start to move under the driving of a motor body. Rotation of each eccentric member is monitored by a photoelectric sensor, to detect a phase and a speed of the eccentric member.

In a preferred implementation, a scale 15 is provided on an upper end surface of the eccentric member; and the scale 15 may be attached to a surface of the eccentric member by using paint with high reflectivity to form a mark with high reflectivity. In another implementation, the scale 15 may be obtained by laser engraving on the surface of the eccentric member. In still another embodiment, the scale 15 may be formed on the surface of the eccentric member by embedding a smooth metal scale mark after etching.

Preferably, the scale 15 includes a plurality of marking line segments; a central point of each marking line segment is located on a circumference with the same circle center as an eccentric member; moreover, an extension line of each marking line segment passes through the circle center of the eccentric member.

Preferably, the marking line segments have the same length.

Preferably, an included angle between every two adjacent marking line segments is equal.

With the above arrangement, the scale 15 has two surfaces with obvious differences in roughness, and the two surfaces are marked on an end surface of the eccentric member with an equal included angle and/or spacing.

Further, the photoelectric sensor is a detection sensor with a transmitting end and a receiving end; and after being emitted from the transmitting end, detection light travels toward the end surface of the eccentric member. There are three situations where the detection light is highly recognizable:

When no detection light is projected on the eccentric member, no optical signal of reflected light 100 is generated.

When the detection light is projected on the end surface of the eccentric member, but is not projected on the scale 15, or is projected on a rough part of the scale 15, the reflected light 100 is weakly reflected, with a light intensity at a low level.

When the detection light is projected on the surface with high reflectivity in the scale 15, a strong reflected light intensity is generated.

By the optical signal of the reflected light 100 obtained by the receiving end, a current rotation phase of the eccentric member can be clearly distinguished, and further, a current angular velocity ω of the eccentric member can be obtained by calculating a time-based change rate of the phase.

Further, after obtaining a plurality of operating parameters of the master motor, the control module further controls operations of other slave motors to synchronize with the master motor with a speed and a phase of the master motor as references.

The control module is configured to generate control digital signals for the slave motors by using a proportional-integral-derivative (PID) algorithm, and then convert the digital signals into analog signals to drive a plurality of slave motors to operate in phase synchronization.

Because a speed of a motor is constantly changing during operation, in order to implement synchronous vibration of a vibration system, it is necessary to make eccentric members of a plurality of vibration motors be in the same phase and rotate at the same angular speed. Since the angular velocity cannot change suddenly, when a rotation cycle time T of the eccentric members is determined, an integral of the angular velocity ω of the eccentric members in the time T is a circumference 2π. Let ω(t) be the angular velocity of the eccentric members at a time t, $$\int_0^T \omega(t) \cdot dt = 2\pi,$$

where t is any time with a value being 0 to T.

Therefore, in order to implement rotation synchronization of the eccentric members, it is necessary to make the integral of the angular velocity of the eccentric member of each slave motor to time the same as that of the master motor in the same time period.

In addition, the photoelectric sensor uses a discrete sampling control, so it is necessary to convert integral operation in an analog system into numerical operation. As it is known that a value of a rotation cycle T is specified, the photoelectric sensor samples information of a speed detector once about every 2-5 milliseconds, that is, the control module can obtain phase data of each vibration motor for about 200-500 times in one second.

Further, the following control algorithms may be used to control a phase and a rotation speed of each slave motor:

γ(t) is set as a phase difference measured between a slave motor and a master motor at a sampling time t, Kp is set as a proportionality coefficient, Ki as an integral coefficient, and Kd as a differential coefficient, a slave control sub-module corresponding to the slave motor sets an angular velocity $\omega_c$ of the slave motor according to the following calculation formula:

$$U(t) = Kp \cdot r(t) + ki \cdot \sum_{j=0}^{t} r(j) + Kd \cdot (r(t) - r(t-1)); \quad (1)$$

a control expression of U(t−1) at a time t−1 may be obtained from formula (1), that is:

$$U(t-1) = Kp \cdot r(t-4) + ki \cdot \sum_{j=0}^{t-1} r(j) + Kd \cdot (r(t-1) - r(t-2)); \quad (2)$$

a difference between formula (1) and formula (2) may be obtained as follows:

$$U(t)=U(t-1)+Kp \cdot (r(t)-r(t-1))+Ki \cdot r(t)+Kd \cdot (r(t)-2 \cdot r(t-1)+r(t-2));$$

further, by expanding the above equation, the following may be obtained:

$$U(t)=U(t-1)+a_0 \cdot r(t)+a_1 \cdot r(t-1)+a_2 \cdot r(t-2);$$

in the above formulas, u(t) is a ratio of the phases of the slave motor and the master motor at the time t; therefore, the following is solved:

$$a_0=Kp+Ki+Kd;$$

$$a_1=Kp-2Kd; \text{ and}$$

$$a_2=Kd,$$

where three parameters Kp, Ki, and Kd affect whether the control of the slave control sub-module over the slave motor is sensitive and a degree of lag, and therefore, a relevant technician sets values of the three parameters Kp, Ki, and Kd after an experiment; and finally, the angular velocity $\omega_c$ of the slave motor is solved by obtaining the phase difference γ(t) between the slave motor and the master motor and calculating u(t) accordingly.

In the above way, the slave control sub-module constantly corrects the angular velocity $\omega_c$ of the slave motor, so as to keep the phase difference with the master motor synchronized.

Embodiment 3: This embodiment should be understood as including at least all the features of any one of the foregoing embodiments, and is further improved on the basis thereof.

Figure 5:
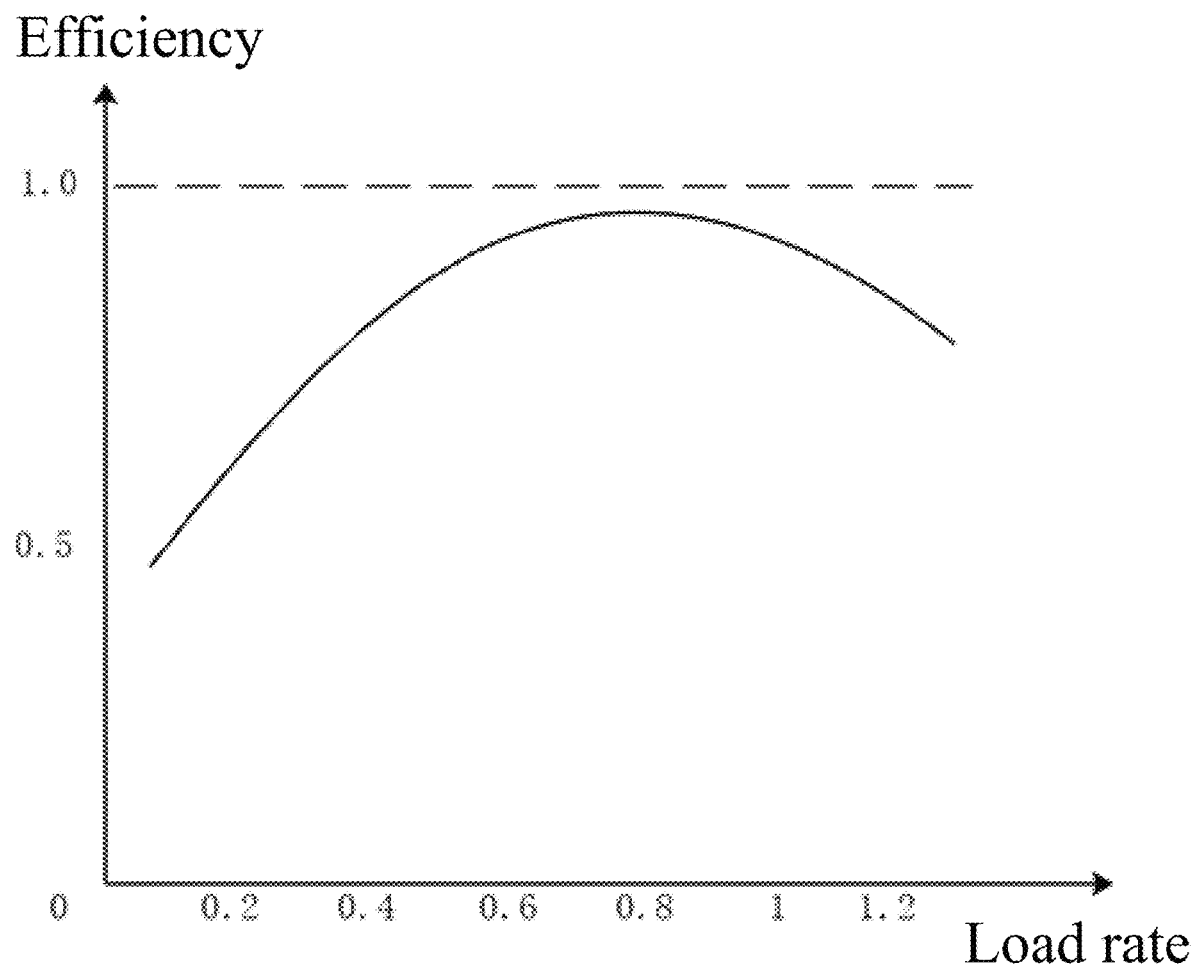
FIG. 5 is a schematic diagram of an efficiency and load rate curve of a motor.

As shown in FIG. 5, based on mechanical performance and efficiency factors of each motor, an efficiency and load rate curve of the motor is a curve that can be determined in advance with efficiency related to a load rate. Generally, when a ratio of an instant load to a rated load of the motor, that is, the load rate, is 0.6 to 0.9, the efficiency reaches a maximum. However, when a load of an vibration motor system in the present disclosure is less than a certain degree, and all the vibration motors are in a small load operating state, the efficiency is greatly lost. Therefore, the control system shuts down some motors when setting that the vibration motor system operates under a small load, so as to improve efficiency of the remaining motors while maintaining certain total output power.

Figure 6:
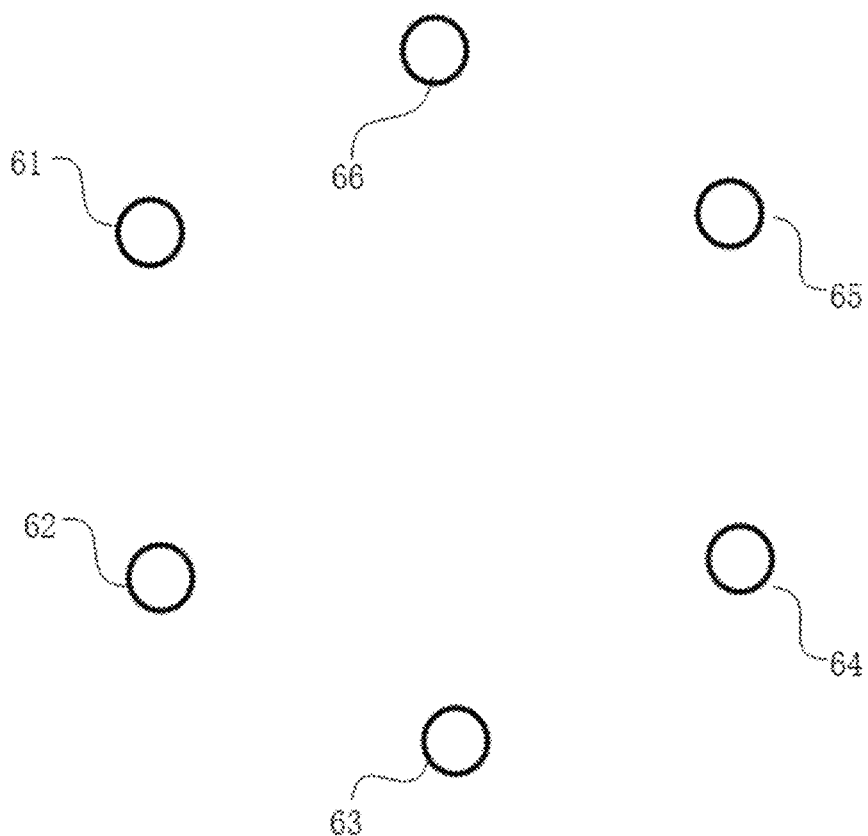
FIG. 6 is a schematic diagram of a system with six vibration motors according to an embodiment of the present disclosure.

In an embodiment, as shown in FIG. 6, the vibration motor system includes 6 vibration motors in total, where a master motor is a first motor 61, and slave motors are a second motor 62, a third motor 63, a fourth motor 64, a fifth motor 65, and a sixth motor 66.

In an embodiment, according to the above conditions A and B, the third motor 63 and the sixth motor 66 may be shut down, so that four vibration motors are reserved to operate.

In an embodiment, the second motor 62, the fourth motor 64, and the sixth motor 66 may be shut down, so that three vibration motors are reserved to operate.

In the above way, efficiency optimization of the vibration motor system is implemented.

In the foregoing embodiments, the descriptions of various embodiments have respective focuses. For a part that is not described in detail or recorded in an embodiment, reference may be made to related descriptions in other embodiments.

Although the present disclosure has been described above with reference to various embodiments, it should be understood that many changes and modifications can be made without departing from the scope of the present disclosure. That is, the methods, systems, and devices described above are examples. Various configurations may include the omission, replacement or addition of various processes or assemblies as appropriate. For example, in an alternative configuration, methods may be performed in an order different from that described, and/or various components may be added, omitted, and/or combined. Moreover, features described with respect to some configurations may be combined in various other configurations, for example, different aspects and elements of configurations may be combined in a similar manner. In addition, with the development of technology, elements therein can be updated, that is, many elements are examples, which do not limit the scope of the present disclosure or the claims.

Specific details are given in the specification to ensure a comprehensive understanding of the example configurations and their implementations. However, configurations may be practiced without these specific details. For example, well-known circuits, processes, algorithms, structures, and techniques are presented without unnecessary details to avoid ambiguous configurations. This description only provides an example configuration and does not limit the scope, applicability or configuration of the claims. On the contrary, the foregoing description of the configuration provides those skilled in the art with an enabling description for implementing the described technology. Various changes can be made in functions and arrangements of elements without departing from the spirit or scope of the present disclosure. To sum up, it is intended that the above detailed description is considered as illustrative rather than restrictive, and it should be understood that the above embodiments should be understood as merely illustrating the present disclosure and not limiting the scope of protection of the present disclosure. Upon reviewing the content of the present disclosure, technicians may implement various changes or modifications, and these equivalent changes and modifications also fall into the scope defined by the claims of the present disclosure.

What is claimed is:

1. An intelligent control system for a circular high-power vibration motor, wherein the control system is applied to a screening device comprising a plurality of vibration motors; and the control system comprises:
    a control module, configured to control a plurality of control sub-modules, wherein each control sub-module is configured to independently control operating parameters of one vibration motor, and the operating parameters comprise at least a phase, a rotating speed, output power, and output torque of the vibration motor;
    vibration motors, wherein a plurality of same vibration motors are mounted to a motor frame and distributed evenly at equal angles; and a first eccentric member and a second eccentric member are respectively provided at two ends of a central shaft of each vibration motor; and
    a detection module, configured to detect rotation phases of the first eccentric member and/or the second eccentric member and to transmit a plurality of pieces of detected rotation phase data to the control module, wherein
    the control module is configured to adjust one or more vibration motors to accelerate or decelerate rotation based on phases of a plurality of the first eccentric members or second eccentric members obtained by the detection module, so that vibration parameters generated by the plurality of vibration motors are the same or tend to be the same; and
    the detection module comprises a plurality of photoelectric sensors; each photoelectric sensor is positioned on a side of a motor body of the vibration motor opposite the first eccentric member or the second eccentric member; the first eccentric member or the second eccentric member is detected as a detection body based on an optical technology, so as to obtain a phase of the first eccentric member or the second eccentric member; and the control module calculates a current rotating speed of the vibration motor based on changes in the phase of the first or second eccentric member;
    wherein the control system designates one of the vibration motors as a master motor, and sets a detection module correspondingly mounted on the master motor as a master detection module; and a control sub-module correspondingly controlling the master motor is a master control sub-module; and
    vibration motors other than the master motor are set as slave motors; detection modules correspondingly mounted on the slave motors are slave detection modules; control sub-modules correspondingly controlling the slave motors are slave control sub-modules;
    wherein after the control module obtains operating parameters of the master motor and a plurality of slave motors, with a speed and a phase of the master motor as references, the control module calculates target operating parameters of the plurality of slave motors based on the operating parameters of the master motor, so that the plurality of vibration motors operate at a synchronous speed, and the first eccentric member and the second eccentric member in each vibration motor are synchronized to have the same phase;
    wherein a control method is applied to the control system, and the control method comprises calculating target output power q of each of n vibration motors based on currently required total output power Q, that is:

$$q = \varepsilon \frac{Q}{n},$$

wherein $\varepsilon$ is a power compensation coefficient, with a specific value set by a relevant technician based on a total power loss during cooperative operation of the plurality of vibration motors after an experiment; and
    the method further comprises shutting down at most half of the n vibration motors based on a power factor curve of each vibration motor, and reserving k motors of the n vibration motors, to achieve a higher energy efficiency ratio; and the following steps are adopted to select a specific number of reserved k motors:
    S100: extracting, by the control module, an efficiency and load rate curve of each vibration motor;
    S200: calculating a current load rate of the vibration motor and efficiency $\eta$ corresponding to the load rate based on operating parameters of the vibration motor;
    S300: if a current efficiency point causes current efficiency $\eta$ to be less than preset minimum efficiency $\eta_{min}$ due to an excessively low load rate, performing step S400; and S400: calculating a number of vibration motors that need to stop operating, and shutting down the vibration motors that need to stop operating;

wherein step S400 comprises the following substeps:

S410: determining a value of n;

S420: calculating a minimum possible value $k_{min}$ of k, that is, calculating n/2 and rounding up to obtain $k_{max}$;

S430: increasing a value of k one by one starting from k=$k_{max}$, and calculating whether the following conditions are met:

condition A: whether k vibration motors are distributed at equal angles; or condition B: whether k vibration motors are distributed symmetrically and whether k is an even number;

S440: setting a current value of k to meet one of the condition A or the condition B, and calculating target output power of each vibration motor and a corresponding efficiency value $\eta_k$ based on the current value of k;

if a plurality of k values, namely $k_1, k_2, \ldots$, all meet one of the condition A or the condition B, recording corresponding efficiency values $\eta_{k1}, \eta_{k2}, \ldots$, and calculating a maximum value thereof as an optimal efficiency value $\eta_{k\text{-}top}$;

if only a unique k value meets one of the condition A or the condition B, setting $\eta_{k\text{-}top}=\eta_k$; and S450: shutting down n-k vibration motors based on a k value corresponding to the optimal efficiency value $\eta_{k\text{-}top}$, wherein motors that are chosen to be shut down exclude the master motor; and one of the condition A or the condition B is still met after n-k vibration motors are shut down;

wherein a ratio of an instant load to a rated load of the motor is the load rate.

2. The control system according to claim 1, wherein the motor frame comprises a plurality of mounting holes for mounting the vibration motors; and the vibration motor is fixedly connected to the motor frame by two or more mounting components arranged on an outer side of the motor body.

3. The control system according to claim 2, wherein 4 to 10 vibration motors are provided.

4. The control system according to claim 3, wherein a plurality of elastic elements are further arranged on one of working surfaces of the motor frame; and the motor frame is supported on a base by the plurality of elastic elements.

5. The control system according to claim 4, wherein cylindrical protective covers connected to the motor body are provided on both sides of the vibration motor; and each protective cover is configured to cover the first eccentric member or the second eccentric member;

the photoelectric sensor is positioned on a circular end surface of the protective cover; the photoelectric sensor is configured to face the eccentric member inside the protective cover; the photoelectric sensor emits detection light to a detected surface of the eccentric member and then receives an optical signal of reflected light of the detection light reflected by the detected surface;

the detected surface of the eccentric member is marked with a scale; during rotation of the eccentric member, the detection light is affected by the scale, thus generating the optical signal of the reflected light that is recognizable; and the detection module obtains the optical signal of the reflected light and transmits the optical signal to the control module for analysis, so as to obtain a plurality of operating parameters of the vibration motor.

* * * * *